United States Patent [19]

Olsson

[11] Patent Number: 4,494,733

[45] Date of Patent: Jan. 22, 1985

[54] ENCLOSURE FOR ANIMALS

[76] Inventor: Jan Olsson, Prästliden 6, 511 00 Kinna, Sweden

[21] Appl. No.: 466,346

[22] PCT Filed: Jun. 9, 1982

[86] PCT No.: PCT/SE82/00201
§ 371 Date: Feb. 2, 1983
§ 102(e) Date: Feb. 2, 1983

[87] PCT Pub. No.: WO82/04378
PCT Pub. Date: Dec. 23, 1982

[30] Foreign Application Priority Data

Jun. 9, 1981 [SE] Sweden ............................... 8103582

[51] Int. Cl.³ .............................................. A01K 3/00
[52] U.S. Cl. .................................... 256/10; 174/117 M
[58] Field of Search .......... 256/10; 174/117 F, 117 M

[56] References Cited

U.S. PATENT DOCUMENTS 2,502,882  4/1950  Perkins ................................... 256/10
2,530,247  11/1950 Koonz ..................................... 256/10
3,504,892  4/1970  Crist ....................................... 256/10

FOREIGN PATENT DOCUMENTS 73529    12/1951  Denmark ............................. 256/10
815500   10/1951  Fed. Rep. of Germany ... 174/117 F
1200263  6/1959   France ................................. 256/10
7710230  3/1979   Netherlands ........................ 256/10
233050   5/1925   United Kingdom ........... 174/117 M Primary Examiner—Andrew V. Kundrat

[57] ABSTRACT

Enclosure for animals comprising one or more tapes (1) extending between fixing points which are spaced apart from each other, which has one or more electrical conductors (4). These are electrically insulated from the ground and can be connected to a source of electricity supply. Each tape (1) is woven from a plurality of longitudinal and transverse force-absorbing textile threads, while the electrical conductors (4) are formed from one or more woven-in longitudinal electrically conductive wires.

6 Claims, 10 Drawing Figures

4,494,733

ENCLOSURE FOR ANIMALS

TECHNICAL FIELD

The present invention relates to an enclosure for animals, comprising one or more tapes, extending from fixing points which are spaced apart, having one or more electrical conductors which are electrically insulated from the ground and which can be connected to a source of electricity.

TECHNICAL PROBLEM

The aim of the present invention is to provide an enclosure which requires minimum maintenance costs, is strong, easy to erect and encloses the animals in an effective and careful manner.

THE SOLUTION

The aim is achieved by means of an enclosure in accordance with the present invention which is characterized in that the tape is woven from a plurality of longitudinal and transverse force-absorbing textile threads and that the electrical conductor is formed by one or more woven-in longitudinal electrically-conductive contact wires with uninsulated surfaces.

BRIEF DESCRIPTION OF DRAWINGS

In the following the invention will be described in greater detail with embodiments by reference to the appended drawings on which FIGS. 4–7 illustrate the fixing devices for attaching the tape to a pole or the like.

BEST MODE OF CARRYING OUT THE INVENTION

Figure 1:
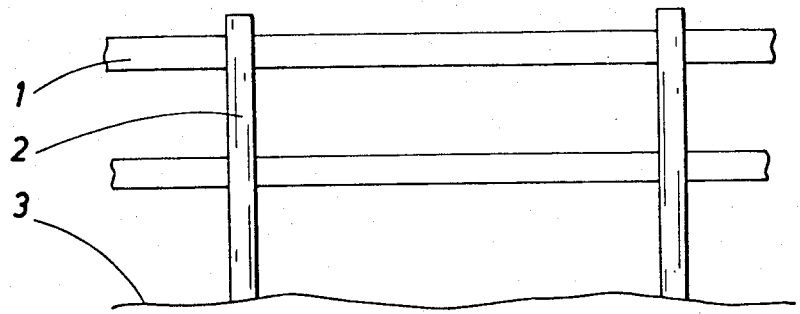
FIG. 1 illustrates, in the form of a partially fragmented view, a section of an enclosure in accordance with the invention.

The enclosure in accordance with the invention consists of one or more tapes 1 which are tensioned between posts 2 which are driven in a conventional manner into the ground 3. The posts can be of timber, metal or the like. In the example shown the tapes are two in number and extend to different heights above the ground so as to form an effective enclosure for both large and small animals, such as horses and their foals. It is also possible to utilize only one tape, or a larger number of tapes, for the enclosure.

In accordance with the invention the tape 1 is made of textile material and is woven from a plurality of longitudinal and transverse textile threads, i.e. warp threads and weft threads. These threads are made from a strong, force-absorbing, relatively light material, e.g. synthetic material, such as polyester yarn, and so as to provide good tensile strength are for example woven in plain weave. These warp and weft threads are electrically insulating. In accordance with the invention electrically conductive, longitudinal contact wires 4 are woven in, in the example shown there are five, which are uniformly distributed across the width of the tape with a central contact wire and with two contact wires located on each side of this wire, whereby the electrical contact wires are at a distance from and thus some distance inside the longitudinal outer edges 5, 6 of the tape.

In an embodiment having a tape width of 45 mm 70 conventional warp threads are employed of electrically insulating polyester thread and five electrically conductive wires. The warp threads employed can be of size NM3, i.e. three meters of yarn thread per gram, while the weft threads can be of size NM9, i.e. nine meters of yarn thread per gram. For example these threads can be made from a white relatively glossy material, but can naturally be made in different colors dependent on the color perception capacity of the animals concerned.

The electrical contact wires 4 are made for example with a core of textile thread, for example the same material as the insulating yarn threads. Here the core is braided with or surrounded by turns of an electrically conductive wire of metallic material, which is thin relative to the core size, e.g. tinned copper wire which thus does not adopt a patina.

Figure 2:
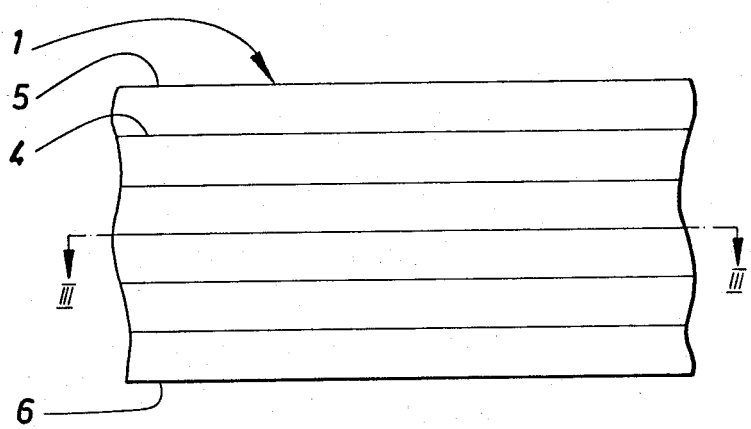
FIG. 2 shows on a larger scale a section of a tape forming part of the enclosure.
Figure 3:
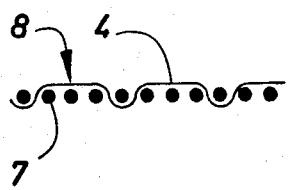
FIG. 3 shows on an even larger scale and in schematic form the path of an electrical contact wire forming part of the tape.

As shown in FIG. 3, which schematically provides a longitudinal section on a larger scale along the line III—III in FIG. 2, the electrical contact wires 4 are with advantage woven in in a special manner. A number of the weft threads 7 are shown schematically in the diagram, and a section of one of the electrical contact wires 4 is shown woven in using a twill weave with three over and three under, i.e. weaving is carried out in such a way that three weft threads in sequence are allowed to extend over the electrical contact wires, while the fourth extends underneath etc. Thus this applies to all five contact wires 4, the majority of which are by such means orientated towards one side 8 of the tape, which thus becomes the top side as shown in FIG. 3. In FIG. 3 the tape is thus twisted in relation to the position adopted during the weaving procedure, which takes place for example on a tape needle loom. In the enclosure this side is turned inwards towards the enclosed area, and hence the side facing the animals has per unit of length a larger number of the contact wires than does the outside which is important because the animals come into contact with the enclosure on the inside, while it is desirable that for example people who come into contact with the tape from the outside should not be unnecessarily subjected to the uncomfortable electric shocks, which however are not harmful. Because the electrical contact wires are not located at the outer edges 5, 6 of the tape, this similarly prevents unnecessary and inadvertent contact by people with the live portion of the tape. Because each of the electrical contact wires 4 is formed by two stranded or twinned elements, namely a yarn core 27 and a metal wire 28 (as explained later in connection with FIGS. 8 to 10) and because of the special weaving, it is possible for the contact wires to project above the remainder of the tape surface so that the animals come more easily into contact with the electricity, and it is thus possible to avoid contact with the tape. This can also be accomplished by choosing thicker dimensions for the core.

Figure 4:
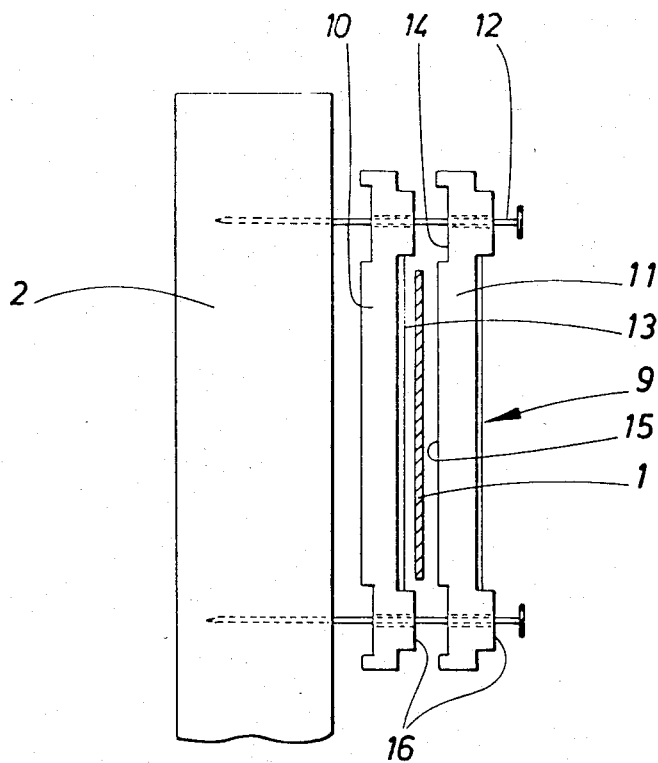
Figure 5:
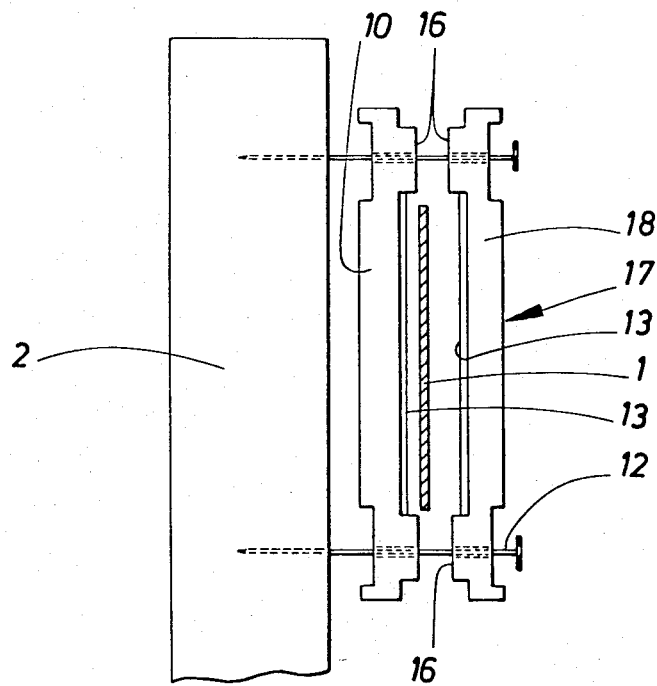

Fixing devices 9 for attaching the tape 1 at the posts 2 also form part of the enclosure in accordance with the invention. In the example shown in FIGS. 4 and 5 each fixing device 9 is divided into two fitting sections 10, 11 of which one fitting section is designed to be attached closest to the post while the other fitting section 11 is designed to be placed against the first section with the tape 1 in the middle. Both fitting sections 10, 11 are made from an electrically insulating material such as plastic, rubber or the like and at the top and bottom have through-holes for fixing elements in the form of nails 12 or the like which are designed to be driven into the posts. The fittings are illustrated in the diagrams partially by exploded views, i.e. with all parts incompletely joined together, for the sake of clarity. In the fully assembled state thus one section 10 rests against the post, the tape 1 being clamped between the two sections when both the nails 12 are driven in and the outer section 11 is pressed against the inner section 10. FIG. 4 illustrates an embodiment with recesses 13, 14 and projections 15, 16 which are designed to be introduced into the corresponding recesses so as to ensure absolute clamping of the tape 1 between both sections. This type of fixture is designed for use on certain of the posts so that after the tape has been stretched out it can be clamped in the stretched position, while some of the intermediate posts can have a fitting 17 of the type illustrated in FIG. 5 where one fitting section 10 is designed in the same way as shown in FIG. 4 with a recess 13 for the tape 1 and projections 16 above and below respectively the tape, while the other fitting section, denoted here by 18, is also made identical with fitting section 10 so that the projections 16 are placed against each other and the recesses 13 in the center of the tape permit the tape to move lengthwise, but provide control of the tape to prevent movement in other directions.

Figure 6:
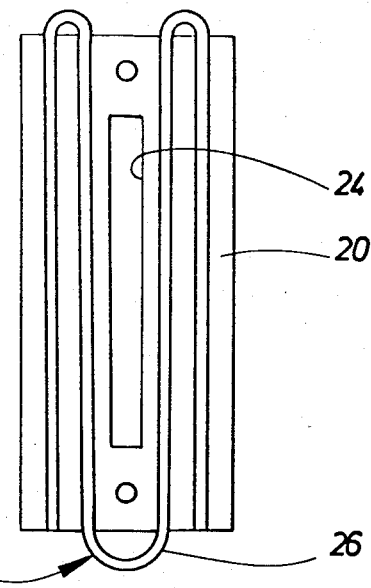
Figure 7:
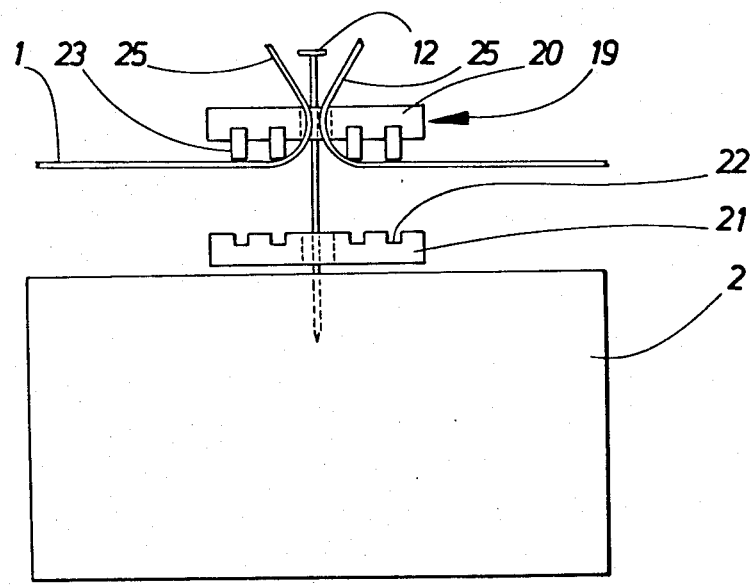

FIGS. 6 and 7 illustrate a third variant of the fixing devices 19, the outer section 20 of which is illustrated in FIG. 6 viewed from the front while the fitting as a whole is shown in FIG. 7 viewed from the top together with the post and associated fixing elements. The inner fixing section 21 has four recesses 22 which extend the length of the fitting section, while the outer fitting section 20 has a metal plate 23 which is designed as an integrated unit and extends in serpentine fashion in a groove which can have the same appearance as the recesses 22 in the fitting section 21. At least the outer fitting section 20 has a slot 24 through which the end of a tape 25 can extend. The fitting 19 as shown in FIG. 7 is also illustrated in the incompletely assembled form and in its assembled state is located with the copper sheet 23 penetrating into the recesses 22 with the tape in between, the tape being firmly held in the fitting by the metal plate 23 made for example of copper in contact with the metal wires of the tape, by which means an electrical connection is formed between two tapes which in the fitting can be joined together. Thus the tape is stretched by drawing it by hand or by means of tongs or the like at the tape ends 25. This fitting 19 is also employed for connecting the tape 1 to a source of electricity, the socket outlet of the latter being connectible to the metal plate 23, e.g. at section 26. The electrical supply source can be of the conventional type for electrical fences for animals, and so designed that it transmits an electrical pulsatory current to the electrical contact wires in the tape of the enclosure at a voltage and current level which is harmless to people and animals, but of such a nature that it creates such discomfort that the animals learn to avoid contact with the tape. However, it is made so strong that it can withstand relatively large loads even though it has a resilient nature, which is an important objective. With conventional enclosures of timber very often horses which come into contact with the enclosure are injured, and this is avoided in accordance with the present invention in that the textile tape is resilient and protects the animals.

Summarizing, the fixing devices insulate the tape and its electrical contact wires from the posts 2. Furthermore, they have the function of joining two tape ends together and forming the point of connection for the supply source.

Figure 8:
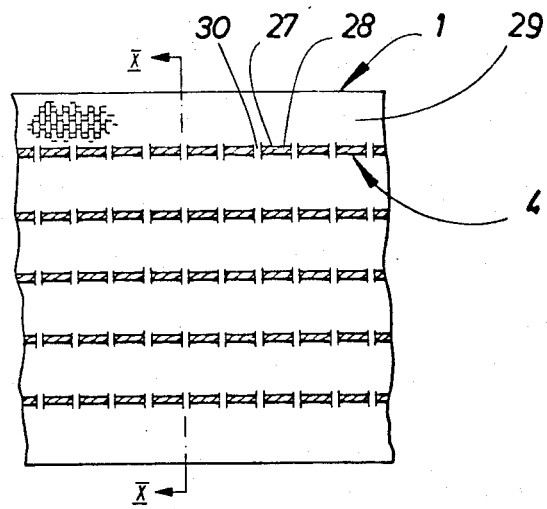
FIGS. 8 and 9 illustrate a section of the tape, viewed from one side and then the other side, where the appearance of the electrical contact wires is illustrated by means of an embodiment.
Figure 9:
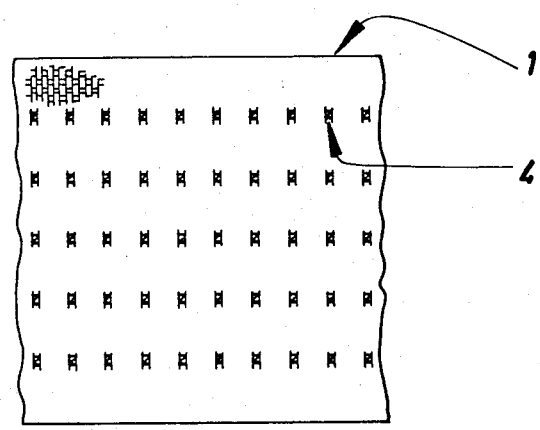
Figure 10:
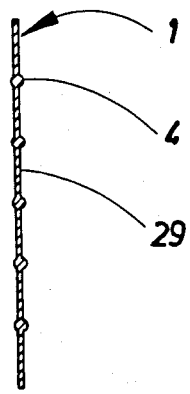
FIG. 10 illustrates a section through the tape along the line X—X in FIG. 8.

FIG. 8 illustrates one side, more particularly the inside of the enclosure, of a portion of the tape 1 where a more detailed view is given of the electrical contact wires 4. This shows that the metal wires 27 are twinned around a core 28. The core can be made of the same material as the remaining longitudinal wires, i.e. an electrically insulating thread, e.g. polyester thread. This thread has the same diameter as, or alternatively a somewhat larger diameter than the remaining longitudinal wires. The twist of the metal wires around the core can be selected to give a suitably-chosen density, e.g. 300 turns per meter, i.e. with about 3 mm between each turn. The twill weave, as shown in FIG. 8 provides a large electrical contact distance per unit of tape length on the side of the tape turned towards the animals. For example contact distances of about 5 mm with about 1 mm interval are obtained where there is a tying down point 30. Hence the contact distance are the distances along which the electrical contact wires run in front of the weft threads. The tying down points are the positions where the electrical contact wires run behind a weft thread, as viewed from the inside of the enclosure. FIG. 9 shows the opposite side of tape 1 which forms the outside of the enclosure, where it can be seen that the contact wires 4, as a result of the twill weave, have an extremely short contact distance per unit of length, e.g. about 1 mm with 5 mm interspace. As pointed out above and as shown by FIG. 10, the electrical contact wires 4 are furthermore above the remaining surface 29 of tape 1 and are orientated towards one side of the tape (in FIG. 10 the right hand side) which represents the inside of the enclosure. Thus the projection of the contact wires 4 is particularly noticeable on one side of the tape and is relatively insignificant or nonexistent on its other side, on which the contact distances are furthermore extremely short. As a result of the projection of the contact wires 4, rapid contact occurs with any portion of an animal's body and the contact wires easily penetrate through the fur and give rise to the desired deterrent electrical shocks. By orientation of the contact wires 4 towards one side of the tape, partly in form of predominantly contact distances and partly in the form of more noticeable projections, this on the one hand increases the electrical shock effect, while this is reduced or is absent completely on the opposite side of the tape, which protects persons located outside the enclosure against unnecessary discomfort.

Furthermore the contact wires 4 and particularly the metal wires 27 are not subjected to any harmful tensile stress in the event of a tensile loading on the tape 1 when an animal presses sideways against the tape. This is achieved on the one hand in that the essentially tensile loading is taken up by the warp threads which are woven with plain weave. This provides a firmer bond on the one hand between the warp threads mutually and also between these and the weft threads, so that the warp threads tend less towards stretching than do the contact wires 4. Because the metal wires 27 are wound around their core, this gives a considerably greater length than that of the core and as a result of this winding the wires have a spiral shape, which permits the metal wires 27 to have greater extensibility in the lengthwise direction of the tape. Dependent on the winding technique employed, a more or less accentuated spiral shape is also obtained for the core 28, which also permits high extensibility on the part of the latter.

The invention is not restricted to the embodiments described above and illustrated in the drawings, but can also be varied within the framework of the following claims. For example it is possible for the contact wires to be made solely from an easily bendable metal wire. Instead of twill weave with three over and one under, other combinations can be envisaged, e.g. four or more over and one or more underneath. The number of contact wires can be more or less than five. The fixing devices can be made in a different way, e.g. designed so that the two fixing sections are replaced by an integrating unit having a slot into which the tape can be introduced. Furthermore an insert of rubber or the like can be placed against the tape in the fixing devices so as to improve friction (and possibly replace the projections) and also the electrical insulation. It is possible for the fittings to be replaced by other more simple fixing devices, with the posts made from an electrically insulating material, e.g. eucalyptus wood or plastic.

I claim:

1. An enclosure for animals, comprising: at least one elongated tape extending between spaced apart points and having spaced longitudinally extending edges and planar sides; each tape comprising: a weave of a plurality of longitudinal and transverse, force-absorbing textile threads, and at least one electrical conductor for connection to a source of electricity and electrically insulated from the ground; each electrical conductor having at least one electrically-conductive contact wire woven into said weave and extending longitudinally of said tape, each contact wire having an uninsulated surface and also having a diameter larger than that of the longitudinal threads; whereby the outer surface of each contact wire is raised above the sides of the tape, each electrical contact wire having a core of textile material, of a certain diameter, and a metal wire wound around said core and having a diameter which is substantially less than the diameter of the core.

2. An enclosure according to claim 1, wherein each electrical contact wire extends over a longer distance on one side of the tape than on the other side thereof.

3. An enclosure according to claim 1, wherein each electrical contact wire projects to a greater extent from one side of the tape than from the other side thereof.

4. An enclosure according to claim 3, wherein each electrical contact wire forms a twill weave.

5. An enclosure according to claim 3, wherein there are at least two electrical contact wires located between said edges of the tape.

6. An enclosure according to claim 5, wherein there are five electrical contact wires uniformly distributed between said edges of the tape.

* * * * *